United States Patent
Chapman

(10) Patent No.: US 10,009,503 B1
(45) Date of Patent: Jun. 26, 2018

(54) OVERLAPPED VECTOR PATTERNED TWO LAYER CORRELATION MARKS

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days. days.

(21) Appl. No.: 15/592,923

(22) Filed: May 11, 2017

(51) Int. Cl.
  *H04N 1/40* (2006.01)
  *H04N 1/60* (2006.01)
  *H04N 1/32* (2006.01)
  *G06F 21/16* (2013.01)

(52) U.S. Cl.
  CPC ......... *H04N 1/32267* (2013.01); *G06F 21/16* (2013.01); *H04N 2201/0094* (2013.01)

(58) Field of Classification Search
  CPC ........ H04N 1/32267; H04N 2201/0094; G06F 21/16
  See application file for complete search history.

(56) References Cited

U.S. PATENT DOCUMENTS

| | | | |
|---|---|---|---|
| 5,734,752 A | 3/1998 | Knox | |
| 5,790,703 A | 8/1998 | Wang | |
| 6,106,021 A | 8/2000 | Phillips | |
| 6,252,971 B1 | 6/2001 | Wang | |
| 6,731,409 B2 | 5/2004 | Wang | |
| 7,070,252 B2 | 7/2006 | de Queiroz et al. | |
| 7,148,999 B2 | 12/2006 | Xu et al. | |
| 7,894,626 B2 * | 2/2011 | Wang | G06T 1/0021 382/100 |
| 8,009,329 B2 | 8/2011 | Bala et al. | |
| 8,077,907 B2 | 12/2011 | Wang | |
| 8,179,570 B2 | 5/2012 | Zhao et al. | |
| 8,283,004 B2 | 10/2012 | Bala et al. | |
| 9,264,575 B1 | 2/2016 | Chapman | |
| 9,415,606 B2 | 8/2016 | Chapman | |
| 9,614,995 B1 | 4/2017 | Chapman | |
| 9,628,661 B2 * | 4/2017 | Dolev | G06F 21/64 |
| 9,628,663 B1 | 4/2017 | Chapman | |
| 2007/0262579 A1 | 11/2007 | Bala et al. | |
| 2008/0299333 A1 | 12/2008 | Bala et al. | |
| 2015/0271364 A1 | 9/2015 | Chapman et al. | |
| 2016/0352961 A1 | 12/2016 | Eschbach et al. | |

* cited by examiner

*Primary Examiner* — Quang N Vo
(74) *Attorney, Agent, or Firm* — Gibb & Riley, LLC

(57) ABSTRACT

First shapes are removed from a first area of intersecting line patterns, and a first security pattern is added to only the first shapes. Second shapes are removed from the first area and the first security pattern, and a second security pattern is added to only the second shapes. The first and second security patterns include the intersecting line patterns phase shifted along first and second vectors. Overlap areas where the first shapes and the second shapes overlap are removed, and a third security pattern is added to only the overlap areas. The third security pattern includes altered first parallel lines and altered second parallel lines of the intersecting line patterns. A screen in a first orientation reveals a distinction between the first area and the first shapes, and the screen rotated reveals a distinction between the first area and the second shapes.

20 Claims, 15 Drawing Sheets

OVERLAPPED VECTOR PATTERNED TWO LAYER CORRELATION MARKS

BACKGROUND

Systems and methods herein generally relate to security printing, and more particularly to printed security features that use transparent keys to reveal hidden security markings.

In the area of security printing, documents are protected from copying, forging, and counterfeiting using multiple techniques. Some methods of security printing use standard materials such as papers, inks, and toners; however, more typically security printing requires special and expensive printing materials. Example documents needing security printing include legal documents, negotiable documents, prescriptions, etc., where a user would like to be able to have a high level of confidence that the document is genuine.

Some security features require a screen or key (a screen) to decode. When copying or scanning Correlation Marks (CR) survive and can still be decoded on copies or scans. Further, CR fonts and a decoding key can be used to produce the correlation effect.

SUMMARY

Methods herein create an electronic document, which will be printed, that has a first area made up of intersecting line patterns (e.g., orthogonally oriented lines). The methods herein remove first shapes from the first area, and then add a first security pattern to only the first shapes in the first area of the electronic document. The first security pattern includes the lines of the intersecting line patterns, that are oriented along a first vector, phase shifted. Thus, the first security pattern is the same as the intersecting line patterns, but with first parallel lines of the intersecting line patterns altered to be out of phase with corresponding first parallel lines of the of the intersecting line patterns.

Such methods subsequently remove second shapes from the first area and the first security pattern, and then add a second security pattern to only the second shapes in the first area of the electronic document. The first shapes and the second shapes are hidden security markings that are only visible using a screen (which is a decoder, key, light filter, etc.). The second security pattern includes lines of the intersecting line patterns, that are oriented along a second vector, phase shifted. Thus, the second security pattern is the same as the intersecting line patterns, but with second parallel lines altered to be out of phase with corresponding second parallel lines of the intersecting line patterns.

These methods also remove overlap areas where the first shapes and the second shapes overlap. Then, such methods add a third security pattern to only the overlap areas in the first area of the electronic document. The third security pattern includes the first parallel lines that are altered to be out of phase (from the first security pattern) and the second parallel lines that are altered to be out of phase (from the second security pattern). The first area, the first security pattern, the second security pattern, and the third security pattern can use the same colors or different colors for the intersecting line patterns.

The methods create a screen that includes polarization slits matching the intersecting line patterns. Thus, the frequency of the decoder matches the frequency of the pattern inks. These methods print the electronic document on print media to produce a printed document, and print the screen on transparent print media. The lines of the intersecting line patterns, the first security pattern, the second security pattern, and the third security pattern are sized and spaced to appear the same (e.g., to a human observer viewing the first area of the printed document).

Also, placing the screen on the first area of the printed document in a first orientation reveals a distinction (e.g., to a human observer viewing the first area of the printed document) only between the first area and the first shapes. In addition, rotating the screen on the first area of the printed document to a different orientation from the first orientation reveals a distinction (again, to a human observer viewing the first area of the printed document) only between the first area and the second shapes.

An exemplary printing system herein includes (among other components) a processor, and a printing device directly or indirectly electrically connected to the processor. The processor automatically creates an electronic document to have a first area made up of intersecting line patterns (e.g., orthogonally oriented lines). The processor automatically removes first shapes from the first area, and automatically adds a first security pattern to only the first shapes in the first area of the electronic document. The first security pattern includes the intersecting line patterns phase shifted along a first vector. Thus, the first security pattern is the same as the intersecting line patterns, but with first parallel lines altered to be out of phase with corresponding first parallel lines of the intersecting line patterns.

The processor automatically removes second shapes from the first area and the first security pattern. The processor automatically adds a second security pattern to only the second shapes in the first area of the electronic document. The second security pattern includes the intersecting line patterns phase shifted along a second vector. Thus, the second security pattern is the same as the intersecting line patterns, but with second parallel lines altered to be out of phase with corresponding second parallel lines of the intersecting line patterns.

The processor automatically removes overlap areas where the first shapes and the second shapes overlap. The processor automatically adds a third security pattern to only the overlap areas in the first area of the electronic document. The third security pattern includes the first parallel lines that are altered to be out of phase (from the first security pattern) and the second parallel lines that are altered to be out of phase (from the second security pattern).

The processor automatically creates an electronic document screen that includes polarization slits matching the intersecting line patterns. The first shapes and the second shapes are hidden security markings that are only visible using the screen.

The printer automatically prints the electronic document on print media to produce a printed document, and automatically prints a pattern on transparent media to produce a screen. The lines of the intersecting line patterns, the first security pattern, the second security pattern, and the third security pattern are sized and spaced to appear the same to a human observer viewing the first area of the printed document. The first area, the first security pattern, the second security pattern, and the third security pattern can use the same colors or different colors for the intersecting line patterns.

Placing a screen on the first area of the printed document in a first orientation reveals a distinction to a human observer viewing the first area of the printed document only between the first area and the first shapes. Further, rotating the screen on the first area of the printed document to a different orientation from the first orientation reveals a distinction to a human observer viewing the first area of the printed document only between the first area and the second shapes.

These and other features are described in, or are apparent from, the following detailed description.

BRIEF DESCRIPTION OF THE DRAWINGS

The application file contains at least one drawing executed in color. Copies of this patent or patent application publication with color drawing(s) will be by the Office upon request and payment of the necessary fee.

Various exemplary systems and methods are described in detail below, with reference to the attached drawing figures, in which.

DETAILED DESCRIPTION

As noted above, some security features require a screen or key (a screen) to decode. In one example pattern ink correlation (CR) marks and replacement fonts use a vector based approach. The steps for writing vector pattern ink CR marks (e.g. pattern ink text inside a text box) is to write the text box with the background pattern, knock out the text by opaquely writing white text in the text box, and writing the same text with the foreground pattern ink. This can be used as a single layer, but runs into issues for use as two independent layers because the area of overlap shows a mixture of both letters, visually making it difficult or impossible to view the hidden security shapes.

Figure 1:
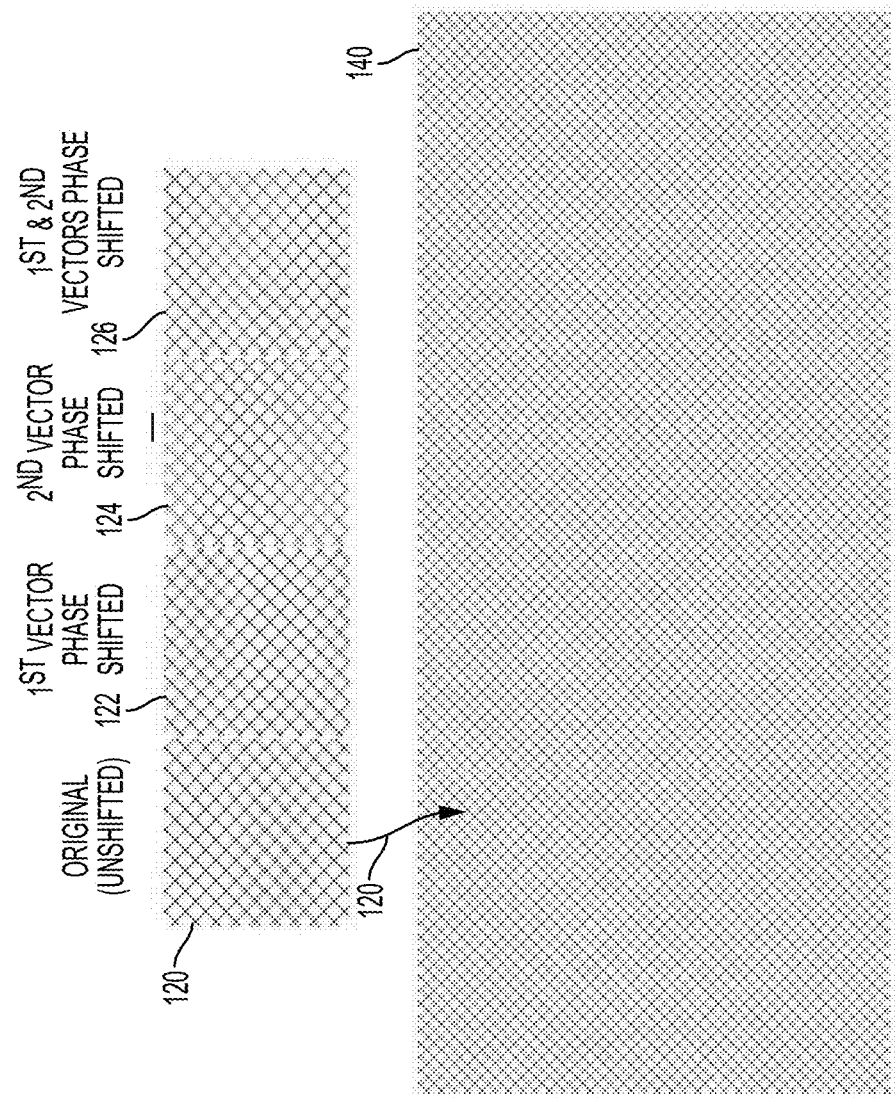
FIGS. 1-8 are schematic diagrams illustrating security patterns generated by systems and devices herein.

In view of this, the methods and systems herein use four or more distinct vector pattern inks 120-126, shown in FIG. 1, to provide multiple hidden overlapping security features that can be independently viewed using different key screens (different optical filters). In one example, the four distinct vector pattern inks 120-126 are created based on different phases each of two vector sets. Each vector set may also have a unique color, or the same color can be used. The four inks 120-126 are used to create hidden security features in a text box by writing overlapping text boxes, overlapping security features, overlapping security features in layer one with text box in layer two, and overlapping security features in layer two with text box in layer one. A strong correlation effect is produced in both overlapping layers and a single solution works for color and monochrome.

Thus, in the example shown in FIG. 1, four almost identical patterns of markings (also referred to as "pattern inks") 120-126 are presented, with a small amount white space between them. These small differences enable the creation of overlapping multilayer CR marks. The left most pattern ink 120 is used for overlapped text boxes and the right most ink 126 is used for overlapped text. The second from the left ink 122 is for the common area for text in layer one and layer two's text box. The second from the right ink 124 is for the common area for text box in layer one and layer two text. In FIG. 1, the left most ink 120 and ink next to it 122 have in phase cyan lines and out of phase magenta lines. The four inks 120-126 represent the four phase combinations of the magenta and cyan lines; however, as noted above, different colors are not required, and different colors are only shown for ease of illustration.

Figure 2:
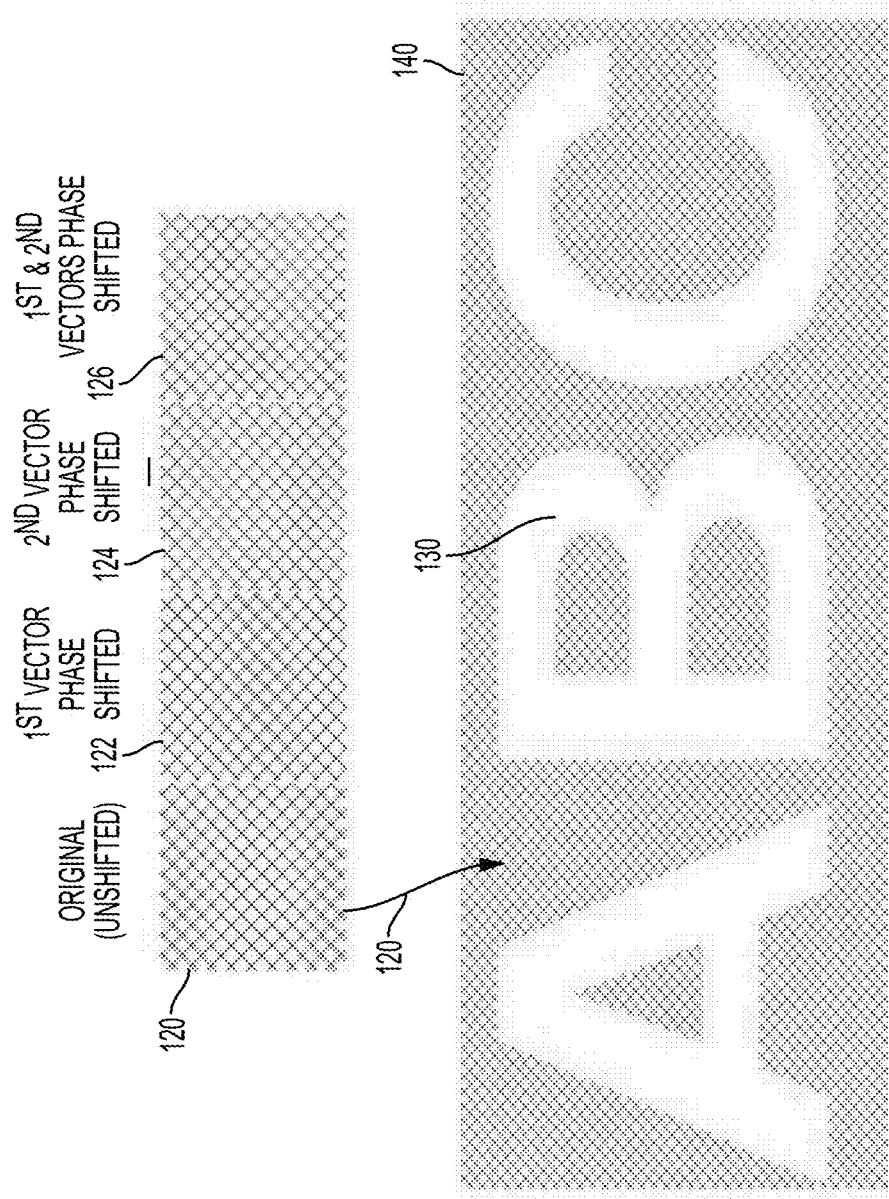
Figure 3:
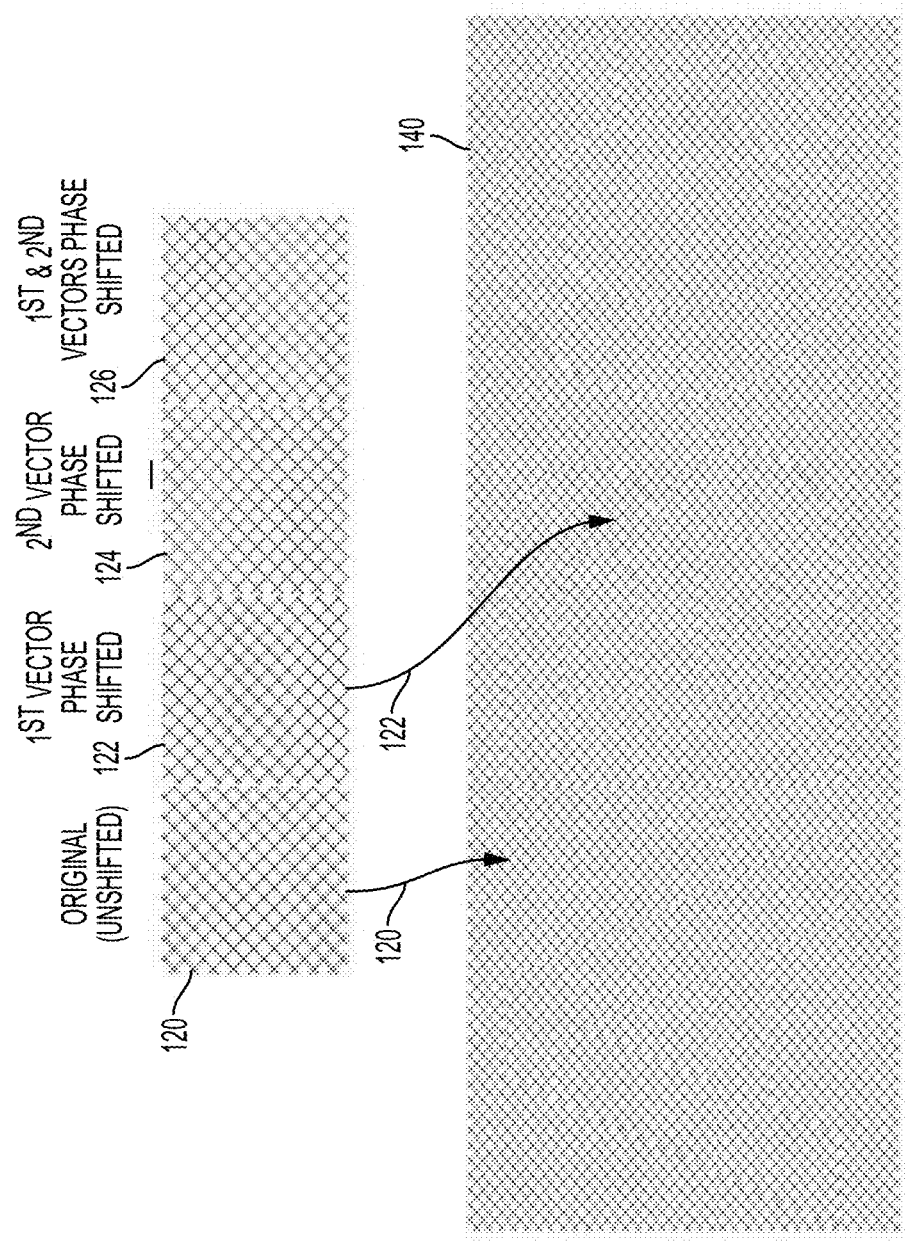
Figure 4:
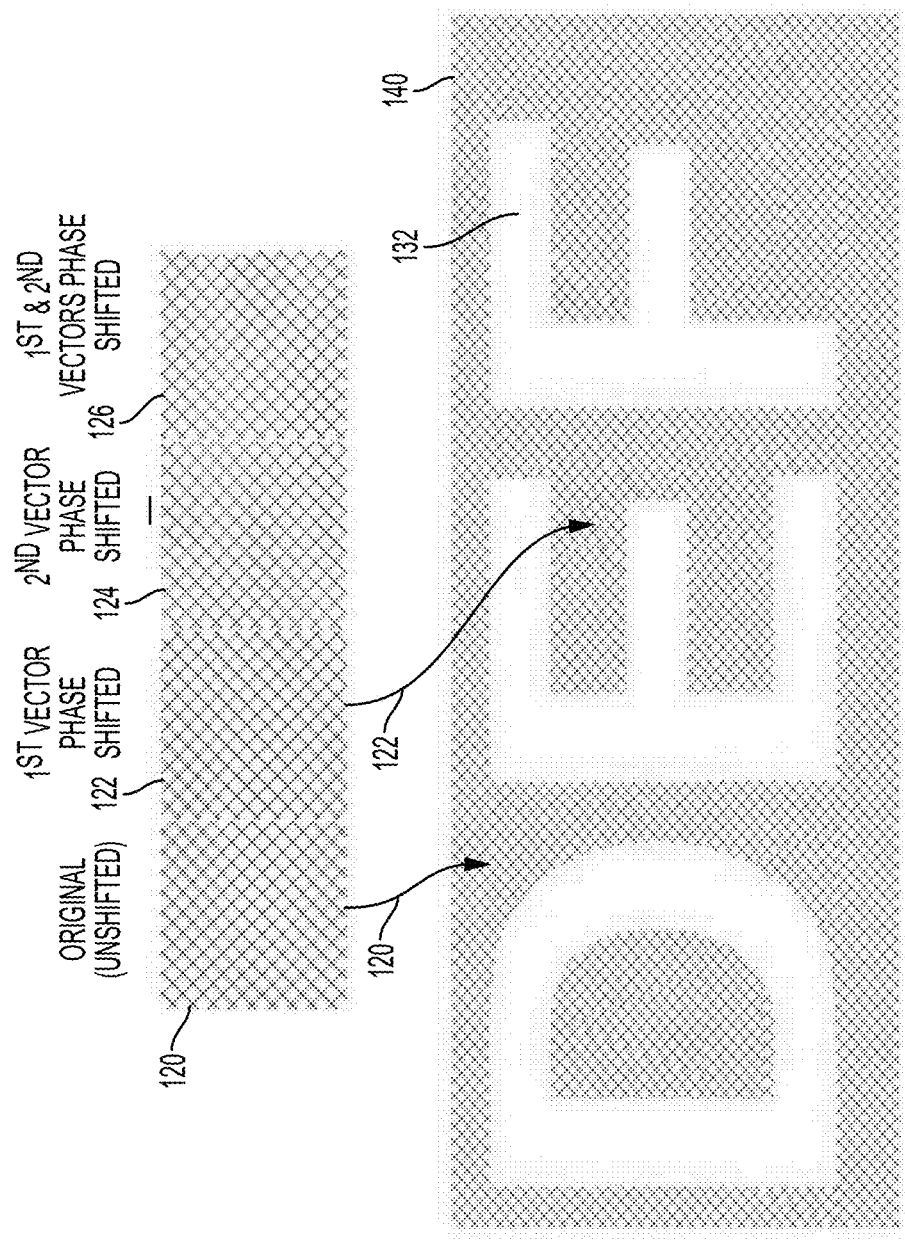
Figure 5:
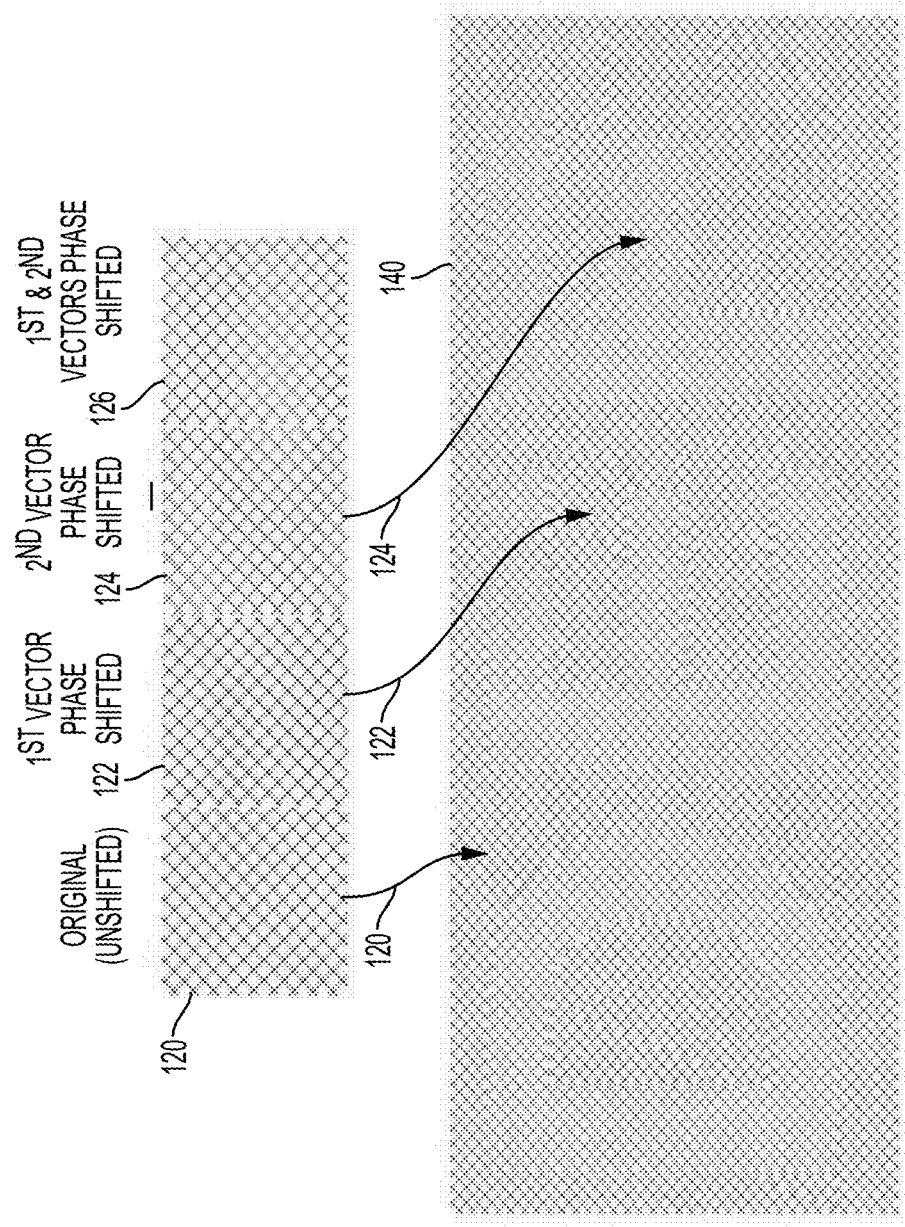
Figure 6:
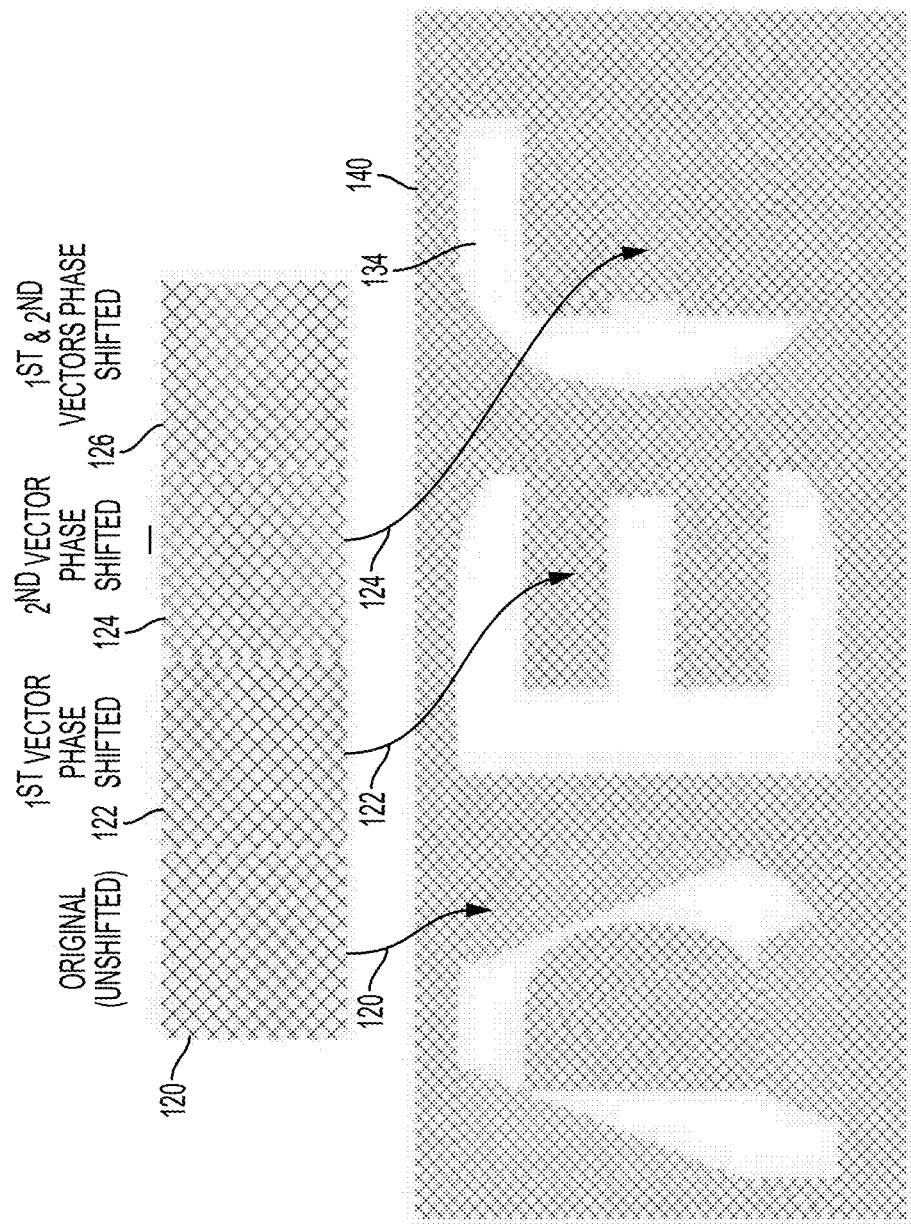
Figure 7:
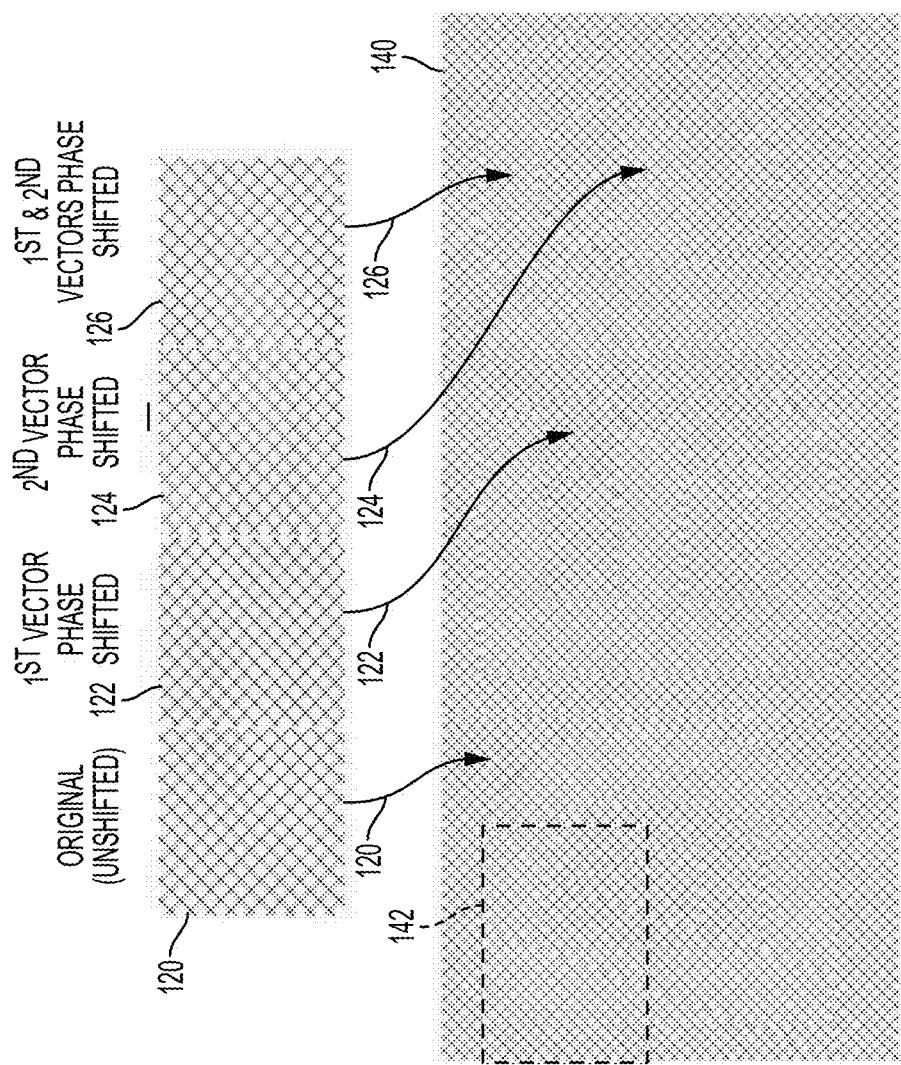

As discussed in greater detail below, FIG. 1 illustrates writing overlapping text boxes with pattern 120 uniformly in area 140. FIG. 2 illustrates knocking out (removing portions of pattern 120 from areas corresponding to) the first layer of text 130; which, in this example, is "ABC." FIG. 3 illustrates writing text "ABC" in the knocked-out areas 130 using pattern 122. FIG. 4 illustrates knocking out (removing portions of inks 120 and 122 from areas corresponding to) the second layer of text 132; which, in this example, is "DEF." FIG. 5 illustrates writing text "DEF" in the knocked-out areas 132 using pattern 124. FIG. 6 illustrates knocking out the (removing portions of inks 120, 122, and 124 from areas corresponding to) areas where text 130 and 132 overlap; shown as item 134. FIG. 7 illustrates writing into the knocked-out areas 134 using pattern 126.

Figure 13:
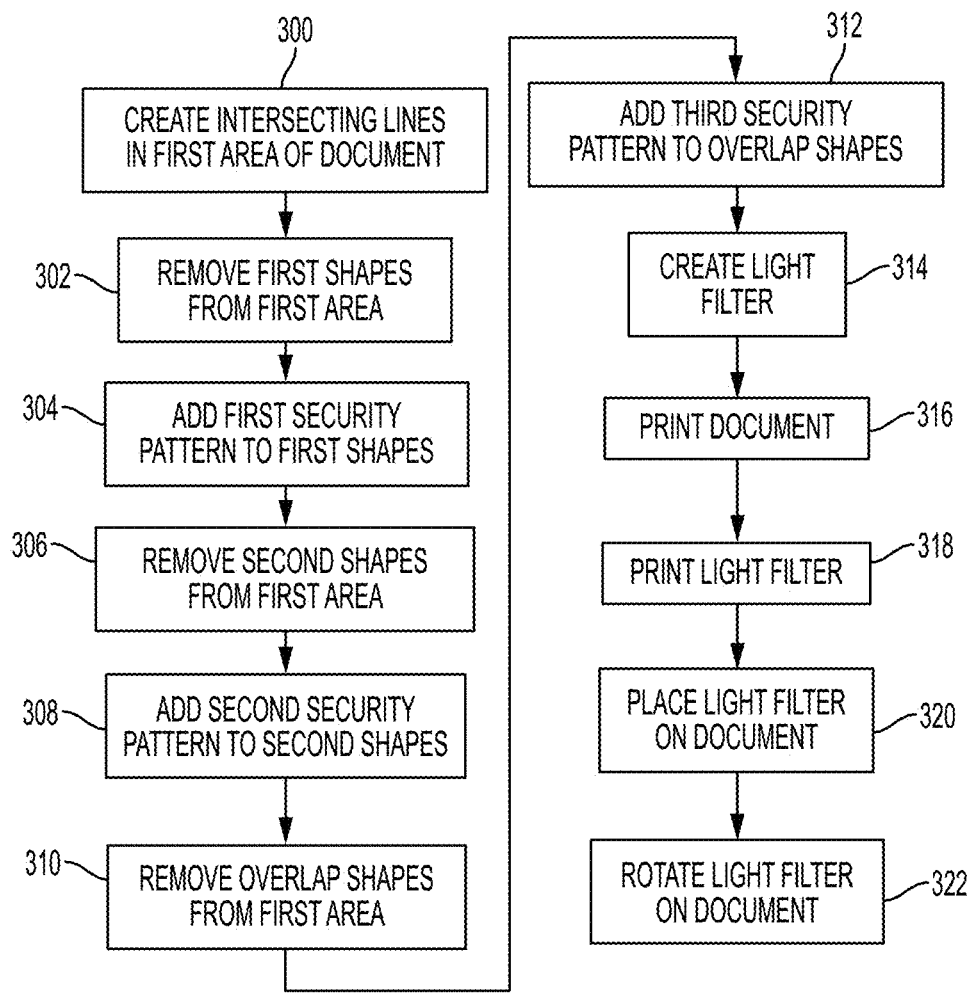
FIG. 13 is a flow diagram of various methods herein.

A more detailed discussion of FIGS. 1-8 is made with reference to the flowchart in FIG. 13. As shown in FIG. 13, exemplary methods herein create an electronic document, which will be printed, that has a first area 140 made up of intersecting line patterns 120 (e.g., orthogonally oriented lines), in item 300 (see FIG. 1 also). The first area 140 can be any portion or, or all of, a document, that contains some markings, such as a graphic portion, text portion, a combination of graphics and text, etc.

In item 302 (also shown in FIG. 2) the methods herein remove first shapes 130 from the first area 140, and then add a first security pattern 122 to only the first shape areas 130 in the first area 140 of the electronic document in item 304 (see FIG. 3). As shown in FIG. 3, the first security pattern 122 is made up of lines similar to the intersecting line patterns 120, that are oriented in one direction (e.g., along a first vector), but that are phase shifted relative to the similarly oriented lines of the intersecting line patterns 120. Thus, it can be seen in the faint pattern difference showing "ABC" in FIG. 3, that the first security pattern 122 is the same as the intersecting line patterns 120, but with first parallel lines of the intersecting line patterns 120 altered to be out of phase with corresponding first parallel lines of the of the intersecting line patterns 120.

As shown in item 306 (and in FIG. 4), such methods subsequently remove second shapes 132 from the first area 140 and the first security pattern 122, and then (as shown in FIG. 5) add a second security pattern 124 to only the second shapes 132 in the first area 140 of the electronic document in item 308. The second security pattern 124 is made up of lines similar to the intersecting line patterns 120, that are oriented along a second vector, but that are phase shifted relative to the lines of the intersecting line patterns 120. Thus, it can be seen in the faint pattern difference showing "DEF" in FIG. 5, that the second security pattern 124 is the same as the intersecting line patterns 120, but with second parallel lines altered to be out of phase with corresponding second parallel lines of the intersecting line patterns 120.

As used herein, the "first parallel lines" of a pattern are oriented differently from, and are not parallel to the "second parallel lines." Therefore, the phase shifted lines of the first security pattern 122 and the phase shifted lines of the second security pattern 124 are not parallel to one another (e.g., can be orthogonal to each other); even, though such phase shifted lines are parallel to corresponding lines of the intersecting line patterns 120.

In other words, the first security pattern 122 includes first lines altered in a first aspect (that are parallel to, but out of phase with corresponding lines of the intersecting line patterns 120); and the first security pattern 122 also includes second lines that intersect the first lines, and that are parallel to and in phase with other corresponding lines of the intersecting line patterns 120. Similarly, the second security pattern 124 includes first lines that are altered in a different, second aspect (that are parallel to, but out of phase with corresponding lines of the intersecting line patterns 120); and the second security pattern 124 also includes second lines that intersect the first lines, and that are parallel to and in phase with other corresponding lines of the intersecting line patterns 120. However, the phase shifted lines of the first security pattern 122 and the phase shifted lines of the second security pattern 124 are not parallel to one another.

In item 310, these methods also remove overlap areas 134 where the first shapes 130 and the second shapes 132 overlap. Therefore, as can be seen in FIG. 6, the portion where the "D" overlaps the "A" is removed, and the same occurs for the overlap of the "E" and "B"; as well as the "F" and the "C."

Then, in item 312 (and shown in FIG. 7) such methods add a third security pattern 126 to only the overlap areas 134 in the first area 140 of the electronic document. The third security pattern 126 includes the first parallel lines that are altered in the first aspect (e.g., to be out of phase (from the first security pattern 122)) and the second parallel lines that are altered in the second aspect (e.g., to be out of phase (from the second security pattern 124)).

Figure 8:
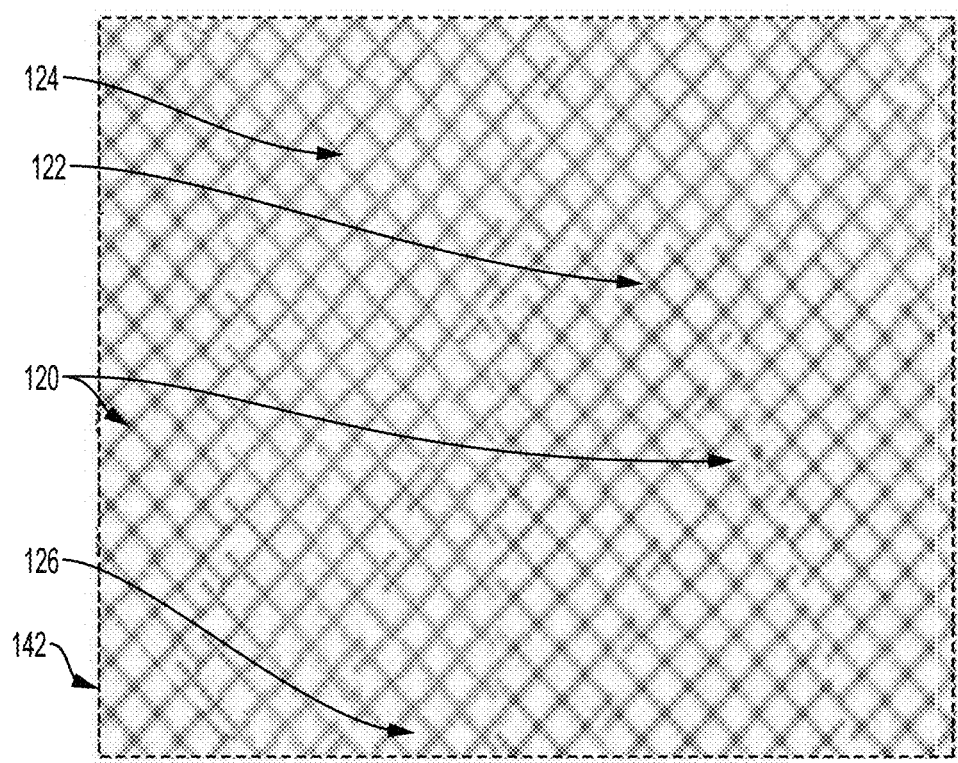

FIG. 8 is a greatly magnified view of a portion 142 of the already magnified view in FIG. 7. The magnified portion 142 in FIG. 8 illustrates that the third security pattern 126 is made up of the first parallel lines that are altered to be out of phase from the first security pattern 122, and the second parallel lines that are altered to be out of phase from the second security pattern 124. Therefore, as shown in FIG. 8, the third security pattern 126 includes first lines that are parallel to, but out of phase with corresponding lines of the intersecting line patterns 120; and the third security pattern 126 also includes second lines that intersect the first lines, and that are parallel to, but also out of phase with, other corresponding lines of the intersecting line patterns 120. Thus, all lines in the third security pattern 126 are out of phase with corresponding lines of the intersecting line patterns 120; while, to the contrary, the first security pattern 122 and the second security pattern 124 include some lines that are in phase with corresponding lines of the intersecting line patterns 120, and some lines that are out of phase with corresponding lines of the intersecting line patterns 120.

While different colors are used in FIGS. 1-8, such are included in the drawings to help understanding, and different colors can be used, but are not required with methods herein. Therefore, the first area 140, the first security pattern 122, the second security pattern 124, and the third security pattern 126 can use the same colors or different colors for the intersecting line patterns 120.

Also, FIGS. 1-8 are greatly magnified from what would actually be printed in order to allow the reader to see the pattern differences; however, when the printed copy is viewed with the unaided human eye, regions 120-126 would be indistinguishable from one another. The patterned lines 122-126 in the first shapes 130 and the second shapes 132 are hidden security markings that are indistinguishable when viewed with the unaided human eye, and are only visible under high magnification or using a screen (which is a decoder, key, light filter, etc.). Thus, the lines of the intersecting line patterns 120, the first security pattern 122, the second security pattern 124, and the third security pattern 126 are sized and spaced to appear the same (e.g., to a human observer viewing the first area 140 of the printed document).

Figure 9:
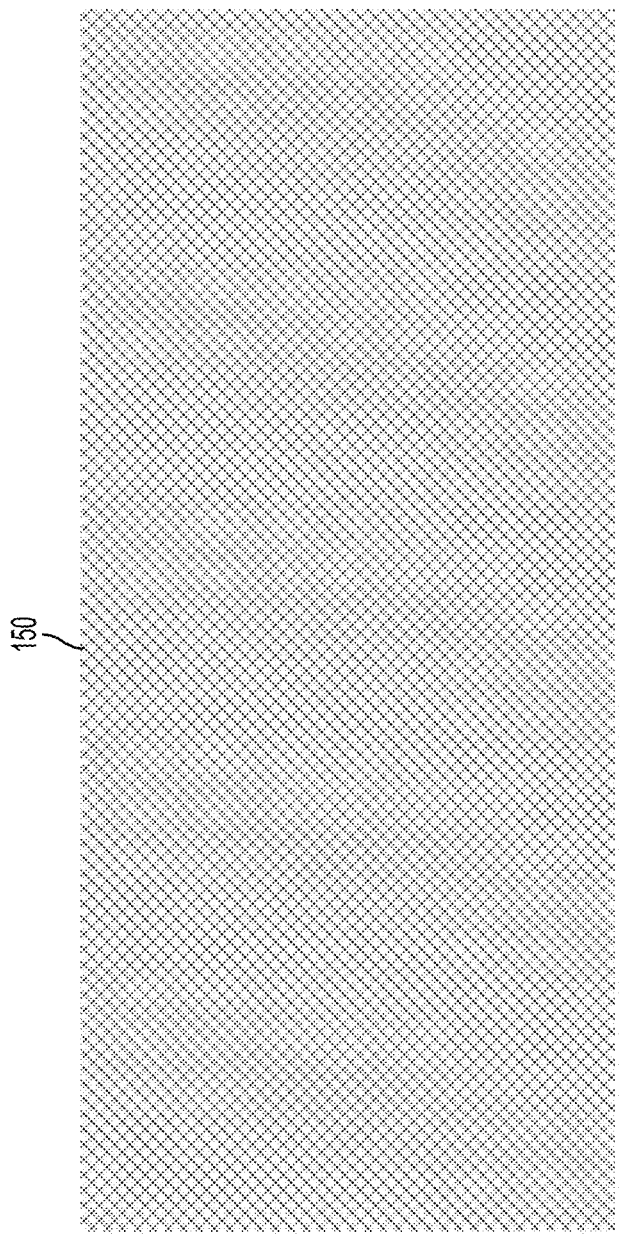
FIG. 9 is a schematic diagram illustrating a screen generated by systems and devices herein.

In item 314, these methods create a screen (as another electronic document) that includes first polarization slits that match the intersecting line patterns 120. Thus, the frequency of the decoder matches the frequency of the pattern inks. In item 316, these methods print the electronic document on print media to produce a printed document 160 (shown in FIG. 10), and print the screen 150 (shown in FIG. 9) on transparent print media in item 318. Note that the screen 150 does not need to be printed with every document, but is printed at least once to be used with many different printed documents.

Figure 10:
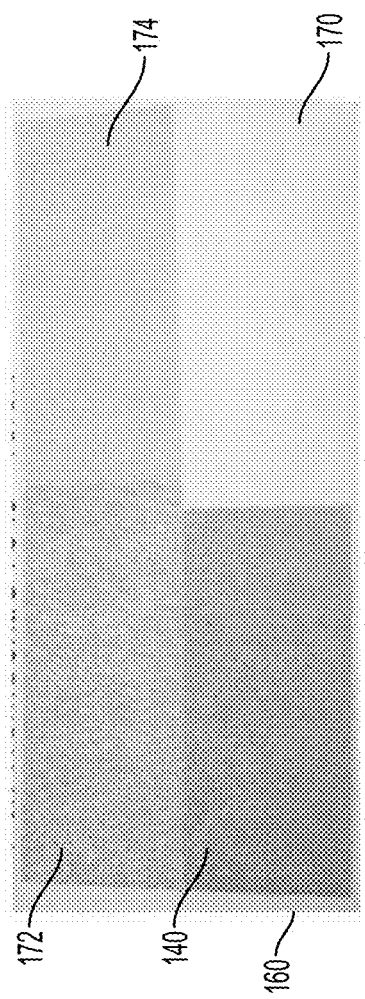
FIGS. 10-12 are photographs of security patterns generated by systems and devices herein.

As shown in FIG. 10, the printed document 160 includes an unprinted region 170; and a region 172 having only the intersecting line patterns 120, and the first security pattern 122 (in the "ABC" pattern used in the previous example). Similarly, the printed document 160 includes a region 174 having only the intersecting line patterns 120, and the second security pattern 124 (in the "DEF" pattern used in the previous example). Additionally, the printed document 160 in FIG. 10 includes the previously discussed first area 140 printed with the first security pattern 122 (in the "ABC" pattern used in the previous example), the second security pattern 124 (in the "DEF" pattern used in the previous example), and the third security pattern 126 (in the overlapping pattern used in the previous example).

Figure 11:
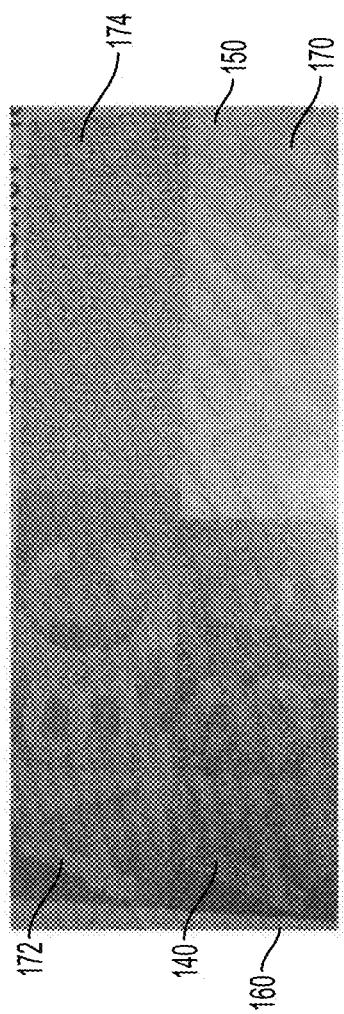

Also, in item 320, these methods place the screen 150 on the first area 140 of the printed document 160 in a first orientation to reveal a distinction (e.g., to a human observer viewing the first area 140 of the printed document 160) only between the first area 140 and the first shapes 130. This is shown, for example, in FIG. 11, where the screen 150 is shown physically placed on top of the printed document 160 in the first orientation, and this reveals a distinction only between the intersecting line pattern 120 and the first shapes 130 (in regions 140 and 172), but not any distinction between the intersecting line pattern 120 and the second shapes 132 in region 174.

Figure 12:
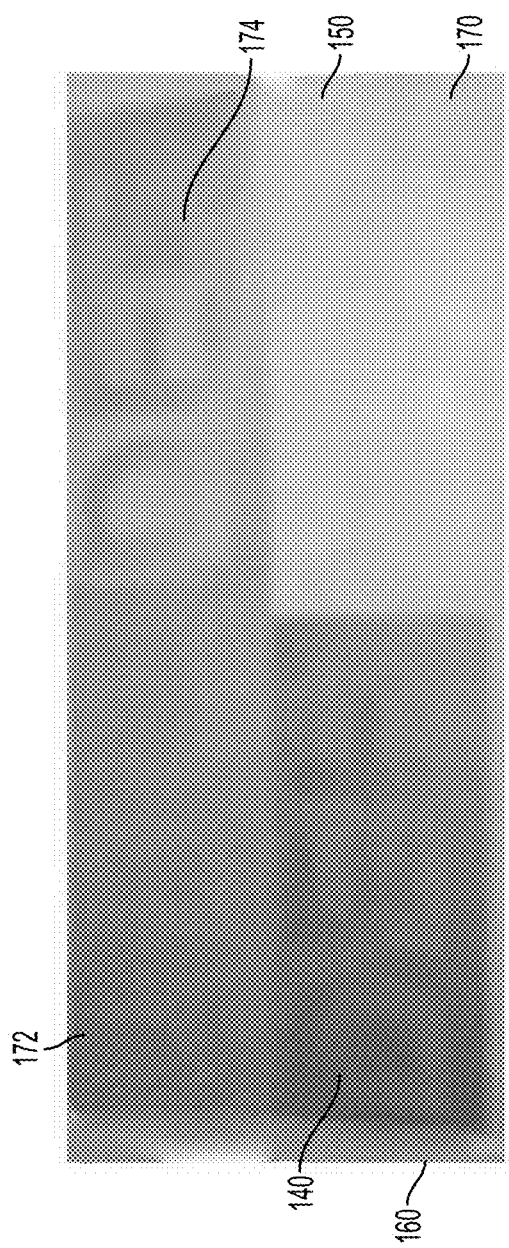

In addition, in item 322, such methods rotate the screen 150 on the first area 140 of the printed document 160 to a different orientation from the first orientation reveals a distinction (again, to a human observer viewing the first area 140 of the printed document 160) only between the first area 140 and the second shapes 132. This is shown, for example, in FIG. 12, where the screen 150 is again shown physically placed on top of the printed document 160 in the second orientation, and this reveals a distinction only between the intersecting line pattern 120 and the second shapes 132 (in regions 140 and 174), but not any distinction between the intersecting line pattern 120 and the first shapes 130 in region 174.

The amount that the screen 150 is rotated to show different security features depends upon the angle between the intersecting lines 120. If such lines are perpendicular or orthogonal, a 90 degree rotation will show the different security features; however, such lines can be at 45 degree, 30 degree, etc., orientation to each other, and a similar rotation of the screen would make such features appear. Additionally, while only two overlapping security features (and two corresponding intersecting lines) are discussed herein, more than two overlapping security features (that would use more than two corresponding intersecting lines) can be used by methods and systems herein; such that partial rotations (e.g., 30 degrees, 45 degrees, 60 degrees, 90 degrees, etc.) each would show a different hidden security feature.

The removal of the overlapping patterns 134 and the addition of the third security pattern 126 into the spaces of the overlapping patterns 134 allows the overlapping security features to be individually viewed (when using the screen 150). Specifically, if steps 310-312 were skipped and the second security pattern 124 was left unaltered over the first security pattern, while all of the second shapes ("DEF") would be visible with the screen 150, portions of the first shapes 130 ("ABC") would not be visible when the screen 150 is applied because portions of the first shapes 130 were removed in step 306. However, by including both the first parallel lines that are altered to be out of phase from the first security pattern 122, and the second parallel lines that are altered to be out of phase from the second security pattern 124 in the third security pattern 126, this includes parts of the first security pattern 122 and the second security pattern 124 in the third security pattern 126; which allows all of the first shapes 130 and all of the second shapes 132 to be viewed with the same screen (but at different rotations). In other words, by including parts of the first security pattern 122 and the second security pattern 124 in the third security pattern 126, the overlap areas 134 visually show parts of the first shapes 130 and the second shapes 132 when the screen 150 is in place, thereby avoiding the problem that would occur if the second security pattern 124 were simply placed over the first shapes 130 without dealing with the overlap.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine (especially when the volume of data being processed, and the speed at which such data needs to be evaluated is considered). For example, if one were to manually attempt to phase shift lines too small to be observed by unaided human eyes within electronic files only storable within computerized devices, such as the methods and devices discussed herein, the manual process would be sufficiently inaccurate and take an excessive amount of time so as to render the manual classification results useless. Specifically, processes such as receiving electronic data streams, updating stored data, using the methods to automatically create overlapping hidden security features in electronic and printed documents (and screens) electronically storing revised data, etc., requires the utilization of different specialized machines, and humans performing such processing would not produce useful results because of the time lag, inconsistency, and inaccuracy humans would introduce into the results. Further, processes such as, electronic transmission of data over networks, creating bitmaps, altering bitmaps, controlling printheads using electronic data within bitmaps, etc., requires the utilization of different specialized machines.

Further, such machine-only processes are not mere "post-solution activity" because the methods utilize machines at each step (adding shapes, removing shapes, making lines in phase/out of phase, etc.), and cannot be effectively performed without machines. Also, the pattern creation and removal, the printing, etc., are integral with the process performed by the methods herein, and are not mere post-solution activity, because the methods herein rely upon the machines to create and print electronic documents, and cannot be performed without such machines. In other words, these various machines are integral with the methods herein because the methods cannot be performed without the machines (and cannot be performed by humans alone).

Additionally, the methods herein solve many highly complex technological problems. For example, as mentioned above, it was previously not effective to create overlapping hidden security features that can be seen with the same screen rotated to different orientations. Methods herein solve this technological problem by keeping lines (122-126) parallel, but phase shifted, from the contrasting background lines (120); and the screen matches the patterns of the lines (120-126) allowing it to be used for both levels of patterns. Also, removal of the overlapping patterns 134 and the addition of the third security pattern 126 into the spaces of the overlapping patterns 134 allows the overlapping security features (122-124) to be individually viewed (when using the screen 150). This provides an additional security feature in printed documents that was not available previously.

Figure 14:
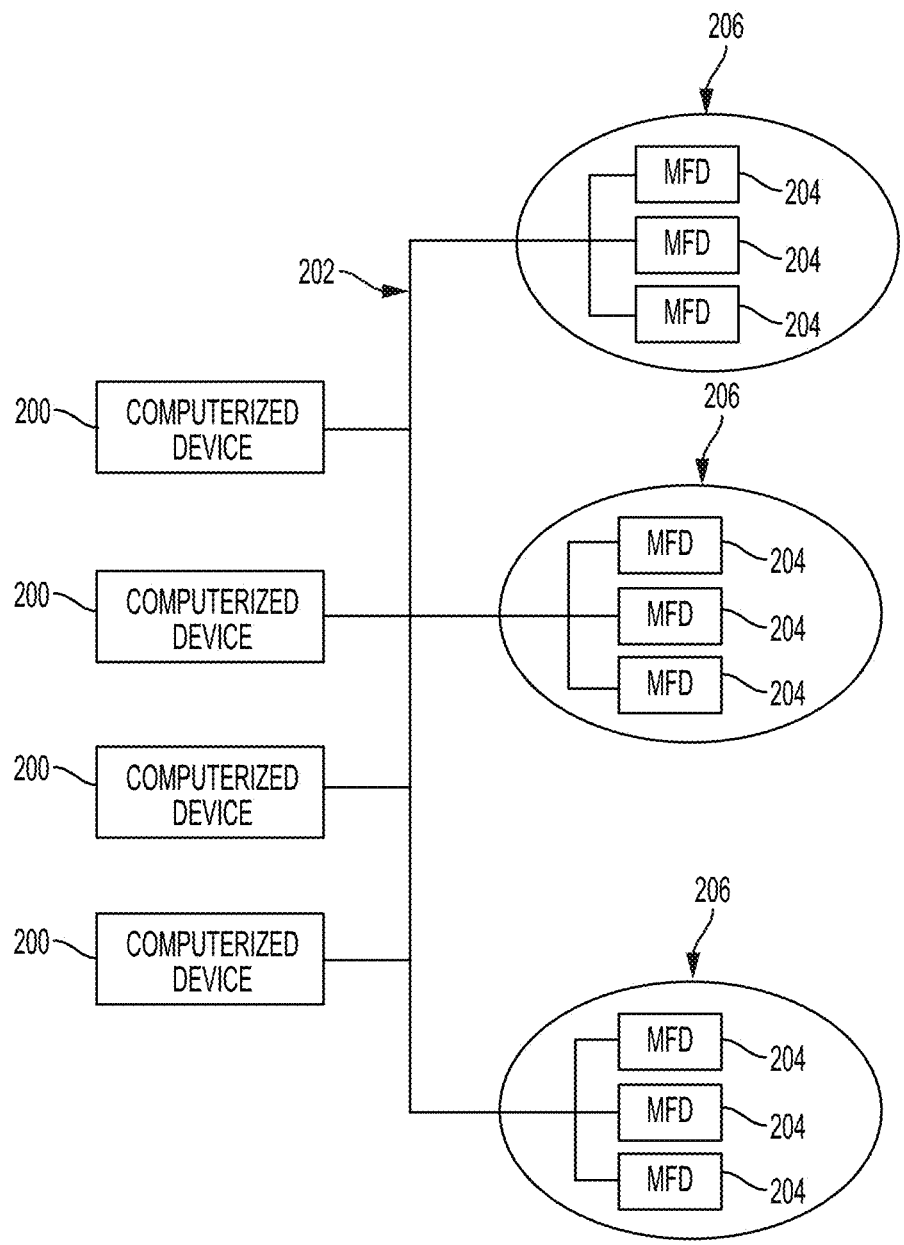
FIG. 14 is a schematic diagram illustrating systems herein.

As shown in FIG. 14, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 15:
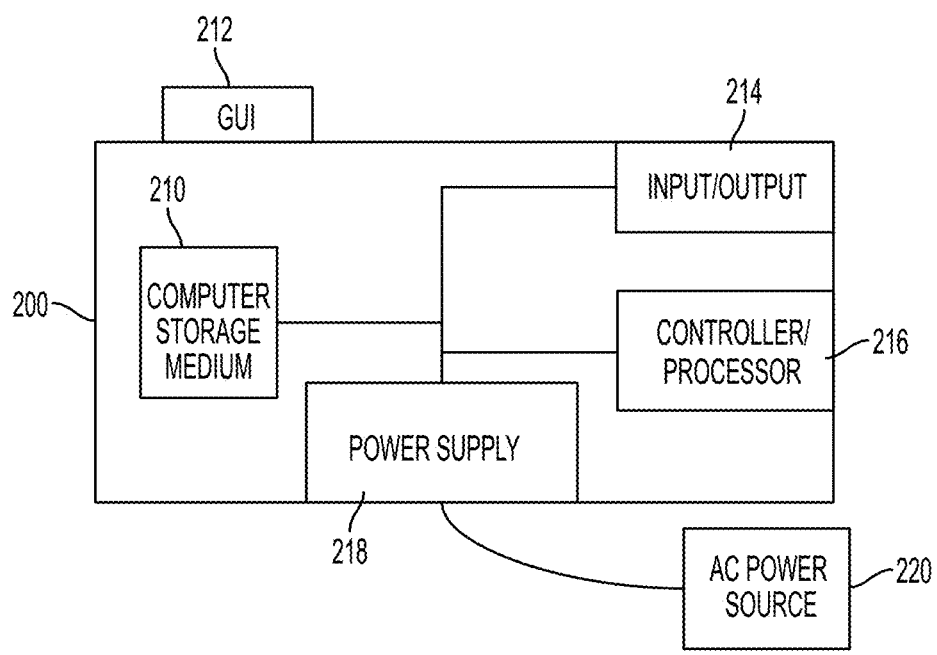
FIG. 15 is a schematic diagram illustrating devices herein.

FIG. 15 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 15, a body housing has one or more functional components that operate on power supplied from an alternating current (AC) source 220 by the power supply 218. The power supply 218 can comprise a common power conversion unit, power storage element (e.g., a battery, etc), etc.

Figure 16:
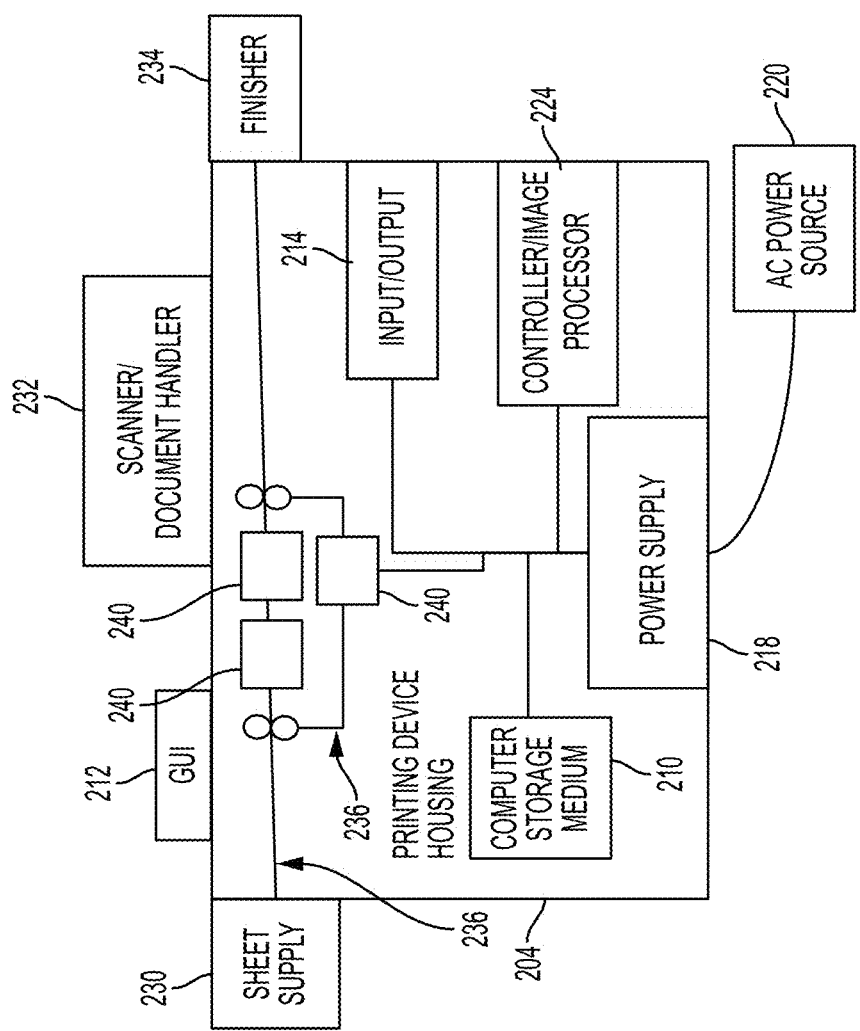
FIG. 16 is a schematic diagram illustrating devices herein.

FIG. 16 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

As would be understood by those ordinarily skilled in the art, the printing device 204 shown in FIG. 16 is only one example and the systems and methods herein are equally applicable to other types of printing devices that may include fewer components or more components. For example, while a limited number of printing engines and paper paths are illustrated in FIG. 16, those ordinarily skilled in the art would understand that many more paper paths and additional printing engines could be included within any printing device used with systems and methods herein.

An exemplary printing system (FIG. 14) herein includes (among other components) a processor (216/224), and a printing device 204 directly or indirectly electrically connected to the processor (216/224). The processor (216/224) automatically creates an electronic document to have a first area made up of intersecting line patterns (e.g., orthogonally oriented lines). The processor (216/224) automatically removes first shapes from the first area, and automatically adds a first security pattern to only the first shapes in the first area of the electronic document. The first security pattern is the intersecting line patterns phase shifted along a first vector. Thus, the first security pattern is the same as the intersecting line patterns, but with first parallel lines altered to be out of phase with corresponding first parallel lines of the intersecting line patterns.

The processor (216/224) automatically removes second shapes from the first area and the first security pattern. The processor (216/224) automatically adds a second security pattern to only the second shapes in the first area of the electronic document. The second security pattern is the intersecting line patterns phase shifted along a second vector. Thus, the second security pattern is the same as the intersecting line patterns, but with second parallel lines altered to be out of phase with corresponding second parallel lines of the intersecting line patterns.

The processor (216/224) automatically removes overlap areas where the first shapes and the second shapes overlap. The processor (216/224) automatically adds a third security pattern to only the overlap areas in the first area of the electronic document. The third security pattern includes the first parallel lines that are altered to be out of phase (from the first security pattern) and the second parallel lines that are altered to be out of phase (from the second security pattern).

The processor (216/224) automatically creates an electronic document screen that includes polarization slits matching the intersecting line patterns. The first shapes and the second shapes are hidden security markings that are only visible using the screen.

The printer 204 automatically prints the electronic document on print media to produce a printed document, and automatically prints a pattern on transparent media to produce a screen. The lines of the intersecting line patterns, the first security pattern, the second security pattern, and the third security pattern are sized and spaced to appear the same to a human observer viewing the first area of the printed document. The first area, the first security pattern, the second security pattern, and the third security pattern can use the same colors or different colors for the intersecting line patterns.

Placing a screen on the first area of the printed document in a first orientation reveals a distinction to a human observer viewing the first area of the printed document only between the first area and the first shapes. Further, rotating the screen on the first area of the printed document to a different orientation from the first orientation reveals a distinction to a human observer viewing the first area of the printed document only between the first area and the second shapes.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand. A print job includes a set of data that is to be printed, and can include images, graphics, and text from a variety of formats. In addition to the print data that will actually be printed on the print media, the print job also includes various commands controlling the printing; and such commands identify the printer to be used, the resolution of printing, the media type and size to be used, color characteristics, gloss characteristics, finishing operations to be performed, destinations of the printed pages, etc. A raster image processor (RIP) is a component used in a printing system that produces a raster image also known as a bitmap from the print job. The bitmap is then sent to a printing device for output. Raster image processing is the process that turns vector digital information into a high-resolution raster image. Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    creating an electronic document to have a first area comprising first line patterns;
    removing first shapes from said first area;
    adding a first security pattern to only said first shapes in said first area of said electronic document, said first security pattern comprises said first line patterns phase shifted along a first vector;
    removing second shapes from said first area and said first security pattern;
    adding a second security pattern to only said second shapes in said first area of said electronic document, said second security pattern comprises said first line patterns phase shifted along a second vector different from said first vector;
    removing overlap areas where said first shapes and said second shapes overlap;
    adding a third security pattern to only said overlap areas in said first area of said electronic document, said third security pattern comprises said first line patterns phase shifted in said first vector and said second vector; and
    printing said electronic document on print media to produce a printed document,
    lines of said intersecting line patterns, said first security pattern, said second security pattern, and said third security pattern are sized and spaced to appear the same to a human observer viewing said first area of said printed document,
    placing a screen on said first area of said printed document in a first orientation reveals a distinction to a human observer viewing said first area of said printed document only between said first area and said first shapes, and
    rotating said screen on said first area of said printed document to a different orientation from said first orientation reveals a distinction to a human observer viewing said first area of said printed document only between said first area and said second shapes.

2. The method according to claim 1, said first line patterns comprise orthogonally oriented lines.

3. The method according to claim 1, said screen that includes polarization slits matching said intersecting line patterns.

4. The method according to claim 1, said first area, said first security pattern, said second security pattern, and said third security pattern use the same colors or different colors for said first line patterns and said second line patterns.

5. The method according to claim 1, said first shapes and said second shapes comprise hidden security markings that are only visible using said screen.

6. A method comprising:
    creating an electronic document to have a first area comprising intersecting line patterns;
    removing first shapes from said first area;
    adding a first security pattern to only said first shapes in said first area of said electronic document, said first security pattern comprises said intersecting line patterns having first parallel lines altered to be out of phase with corresponding first parallel lines of said intersecting line patterns;
    removing second shapes from said first area and said first security pattern;
    adding a second security pattern to only said second shapes in said first area of said electronic document, said second security pattern comprises said intersecting line patterns having second parallel lines altered to be out of phase with corresponding second parallel lines of said intersecting line patterns;
    removing overlap areas where said first shapes and said second shapes overlap;
    adding a third security pattern to only said overlap areas in said first area of said electronic document, said third security pattern comprises: said first parallel lines altered to be out of phase, from said first security pattern; and said second parallel lines altered to be out of phase, from said second security pattern; and
    printing said electronic document on print media to produce a printed document,
    lines of said intersecting line patterns, said first security pattern, said second security pattern, and said third security pattern are sized and spaced to appear the same to a human observer viewing said first area of said printed document,
    placing a screen on said first area of said printed document in a first orientation reveals a distinction to a human observer viewing said first area of said printed document only between said first area and said first shapes, and
    rotating said screen on said first area of said printed document to a different orientation from said first orientation reveals a distinction to a human observer viewing said first area of said printed document only between said first area and said second shapes.

7. The method according to claim 6, said intersecting line patterns comprise orthogonally oriented lines.

8. The method according to claim 6, said screen that includes polarization slits matching said intersecting line patterns.

9. The method according to claim 6, said first area, said first security pattern, said second security pattern, and said third security pattern use the same colors or different colors for said intersecting line patterns.

10. The method according to claim 6, said first shapes and said second shapes comprise hidden security markings that are only visible using said screen.

11. A printing system comprising:
    a processor, and a printing device electrically connected to said processor,
said processor automatically creates an electronic document to have a first area comprising first line patterns,
said processor automatically removes first shapes from said first area,
said processor automatically adds a first security pattern to only said first shapes in said first area of said electronic document, said first security pattern comprises said first line patterns phase shifted along a first vector,
said processor automatically removes second shapes from said first area and said first security pattern,
said processor automatically adds a second security pattern to only said second shapes in said first area of said electronic document, said second security pattern comprises said first line patterns phase shifted along a second vector different from said first vector,
said processor automatically removes overlap areas where said first shapes and said second shapes overlap,
said processor automatically adds a third security pattern to only said overlap areas in said first area of said electronic document, said third security pattern comprises said first line patterns phase shifted in said first vector and said second vector,
said printer automatically prints said electronic document on print media to produce a printed document,
said printer automatically prints a pattern on transparent media to produce a screen,
lines of said intersecting line patterns, said first security pattern, said second security pattern, and said third security pattern are sized and spaced to appear the same to a human observer viewing said first area of said printed document,
placing said screen on said first area of said printed document in a first orientation reveals a distinction to a human observer viewing said first area of said printed document only between said first area and said first shapes, and
rotating said screen on said first area of said printed document to a different orientation from said first orientation reveals a distinction to a human observer viewing said first area of said printed document only between said first area and said second shapes.

12. The printing system according to claim 11, said first line patterns comprise orthogonally oriented lines.

13. The printing system according to claim 11, said screen that includes polarization slits matching said intersecting line patterns.

14. The printing system according to claim 11, said first area, said first security pattern, said second security pattern, and said third security pattern use the same colors or different colors for said first line patterns and said second line patterns.

15. The printing system according to claim 11, said first shapes and said second shapes comprise hidden security markings that are only visible using said screen.

16. A printing system comprising:
a processor, and
a printing device electrically connected to said processor,
said processor automatically creates an electronic document to have a first area comprising intersecting line patterns,
said processor automatically removes first shapes from said first area,
said processor automatically adds a first security pattern to only said first shapes in said first area of said electronic document, said first security pattern comprises said intersecting line patterns having first parallel lines altered to be out of phase with corresponding first parallel lines of said intersecting line patterns,
said processor automatically removes second shapes from said first area and said first security pattern,
said processor automatically adds a second security pattern to only said second shapes in said first area of said electronic document, said second security pattern comprises said intersecting line patterns having second parallel lines altered to be out of phase with corresponding second parallel lines of said intersecting line patterns,
said processor automatically removes overlap areas where said first shapes and said second shapes overlap,
said processor automatically adds a third security pattern to only said overlap areas in said first area of said electronic document, said third security pattern comprises: said first parallel lines altered to be out of phase, from said first security pattern; and said second parallel lines altered to be out of phase, from said second security pattern,
said printer automatically prints said electronic document on print media to produce a printed document,
said printer automatically prints a pattern on transparent media to produce a screen,
lines of said intersecting line patterns, said first security pattern, said second security pattern, and said third security pattern are sized and spaced to appear the same to a human observer viewing said first area of said printed document,
placing a screen on said first area of said printed document in a first orientation reveals a distinction to a human observer viewing said first area of said printed document only between said first area and said first shapes, and
rotating said screen on said first area of said printed document to a different orientation from said first orientation reveals a distinction to a human observer viewing said first area of said printed document only between said first area and said second shapes.

17. The printing system according to claim 16, said intersecting line patterns comprise orthogonally oriented lines.

18. The printing system according to claim 16, said screen that includes polarization slits matching said intersecting line patterns.

19. The printing system according to claim 16, said first area, said first security pattern, said second security pattern, and said third security pattern use the same colors or different colors for said intersecting line patterns.

20. The printing system according to claim 16, said first shapes and said second shapes comprise hidden security markings that are only visible using said screen.

* * * * *